UNITED STATES PATENT OFFICE.

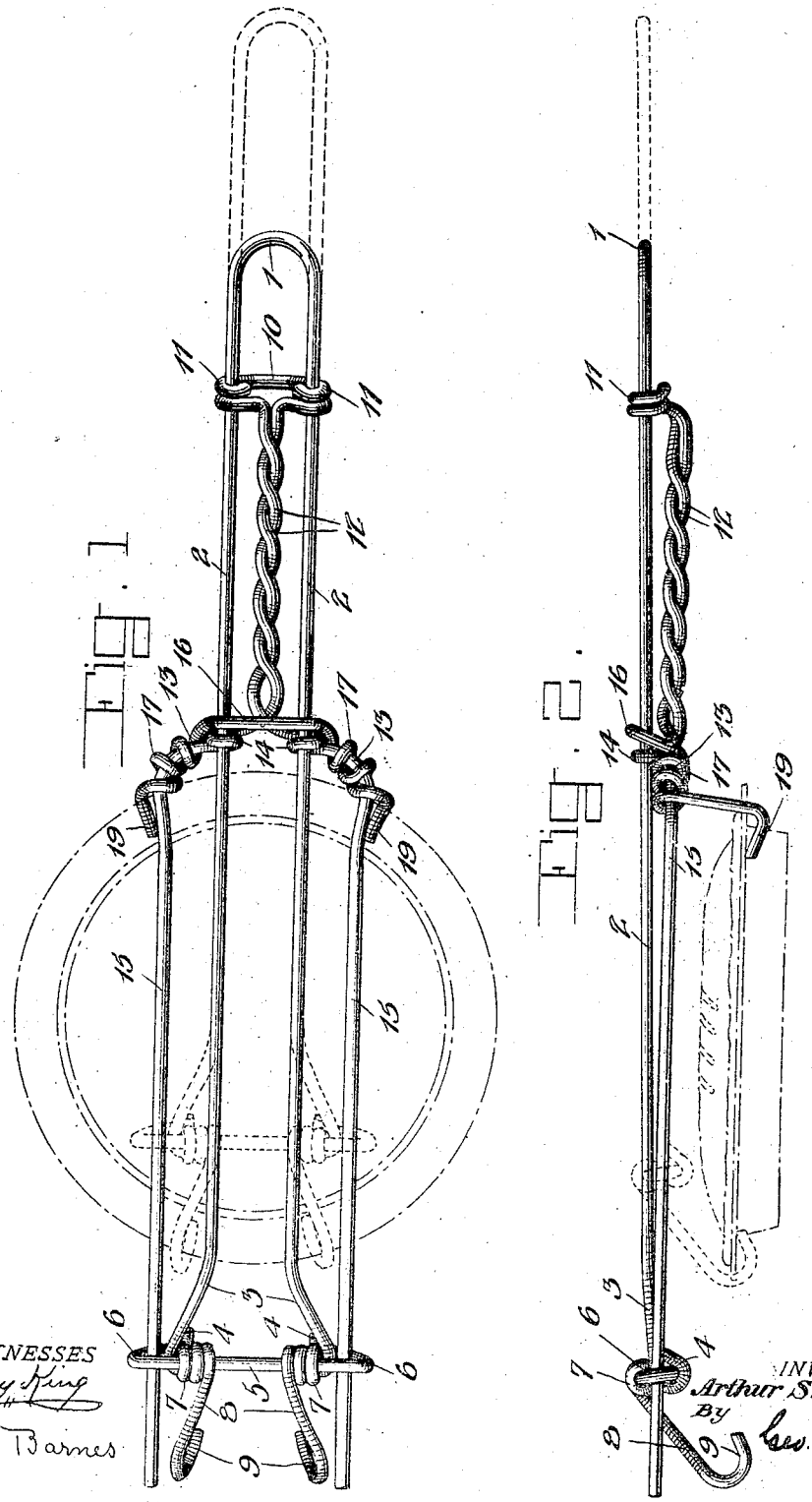

ARTHUR S. EVANS, OF READING, KANSAS.

LIFTER.

1,139,854.   Specification of Letters Patent.   Patented May 18, 1915.

Application filed June 30, 1913. Serial No. 776,593.

*To all whom it may concern:*

Be it known that I, ARTHUR S. EVANS, a citizen of the United States, and a resident of Reading, in the county of Lyon and State of Kansas, have invented certain new and useful Improvements in Lifters, of which the following is a specification, reference being had to the accompanying drawings.

This invention relates to certain new and useful improvements in lifters employed in connection with pans and other culinary vessels.

The object of my invention is to provide a light, readily operated lifter adapted to be clasped upon cooking utensils, kettles, pans and pie plates, so that the same can be easily handled in placing them into an oven or removing the same therefrom or from the stove.

Another object is to provide a device of this general character of a simple and inexpensive nature and of a durable construction which is capable of being conveniently and accurately clasped upon a pot lid to hold the same while draining the vessel.

With these and other objects in view the present invention consists in the combination and arrangement of parts as will be hereinafter more fully described and finally pointed out in the appended claim, it being further understood that changes in the specific structure shown and described may be made within the scope of the claim, without departing from the spirit of the invention.

In the accompanying drawings forming a part of this specification and in which like numerals of reference indicate similar parts in the several views: Figure 1, shows a top view of a lifter embodying my invention disclosing the same clasped upon a pie plate shown in dotted outline. Fig. 2, is an end view disclosing the lifter in dotted lines as clasped to a pie plate.

In carrying out the aim of my invention I employ a handle forming member made of wire including the half round end 1, from which extend in parallel spaced relation two straight handle forming stems 2, 2. As shown each stem 2, ends in an outwardly directed portion 3, terminating in a clenching ear 4.

Secured to the end of the handle forming stems is a wire yoke including the straight bar portion 5, ending in the guide eyes 6, 6. From these eyes the wire is coiled, as shown at 7, about the stem portion 5 and is then continued in the outwardly directed, yieldingly held carrying hooks including the stems 8, and the hooks 9. As shown in Figs. 1 and 2, the ears 4, are clenched into the eyes 6, so that this yoke forms a part of the handle forming member.

Slidably held upon the stems 2, is the collar 10, having the oppositely positioned ears 11, encompassing the handle stems 2. From the collar 10, the wire member is continued in the twisted stem 12, which is held out of alinement but parallel with the members 2, so that when the lifter is used the twisted stem 12, will be a suitable distance below the members 2, the twisted stem 12 forming, with the stems 2, a double handle. These twisted stem members 12, are continued in opposite directions to form the curved shoulder portions 13, each including an intermediately positioned eye 14, these eyes 14, being in alinement with the eyes 11, and also encompassing the handle forming stems 2. As shown each curved shoulder 13, is continued in a straight guide stem 15, these stems being slidably held within the guide eyes 6. The twisted stem 12, and the guide stems 15, are of such a length that when the handle forming member is shoved outward the eyes 6, will not become disengaged from the stems 15.

In connection with the yoke 5 which slides upon the guide stems 15 I employ a sliding yoke including the straight bar portion 16, which extends transversely across the handle forming stems 2, adjacent to the eyes 14, and has its ends 17, coiled about the curved portions 13, and ending in the inwardly directed yieldingly held carrying hooks 19, which are inclined toward the carrying hooks 9. The hooks 19, are spaced farther apart than the hooks 9, as is shown in Fig. 1.

In the use of the lifter the operator shoves the hooks 19 against the nearest edge portion of the vessel and then draws the hooks 9, inward so that these hooks will securely clasp upon the pan or vessel. There is sufficient elasticity in the hooks to insure the vessel being firmly held against slipping.

These lifters are made in suitable sizes, are simple and inexpensive in construction, are readily operated and can be clasped upon a culinary vessel with ease, accuracy and despatch, in a manner insuring the vessel being held to the holder against casual displacement.

Having thus described my said invention, what I claim as new and desire to secure by United States Letters Patent is:

A lifter of the class described made of wire including in combination, a handle forming member comprising two parallel stems, each ending in a clench ear, a yoke including a straight portion ending in two guide eyes from which the wire is continued to form two outwardly directed carrying hooks, said ears clenched into said guide eyes, a collar having ears encompassing said stems and continued in a twisted stem held parallel with said first mentioned stems to form therewith a double handle and continued in opposite directions to form two curved shoulder portions each including an eye encompassing said first mentioned stems, said shoulder portions being continued in two straight guide stems slidably held within said guide eyes, and a second yoke including a portion coiled about said shoulder forming portions and ending in two inwardly directed carrying hooks inclined toward said first mentioned hooks, arranged as set forth.

In testimony whereof I affix my signature, in the presence of two witnesses.

ARTHUR S. EVANS.

Witnesses:
 JAMES T. KING,
 FRANK BLUE.